(12) United States Patent
Kimura

(10) Patent No.: US 7,797,494 B2
(45) Date of Patent: Sep. 14, 2010

(54) ARITHMETIC PROCESSOR, INFORMATION PROCESSING APPARATUS AND MEMORY ACCESS METHOD IN ARITHMETIC PROCESSOR

(75) Inventor: Hiroaki Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 12/061,875

(22) Filed: Apr. 3, 2008

(65) Prior Publication Data

US 2008/0294867 A1 Nov. 27, 2008

Related U.S. Application Data

(63) Continuation of application No. PCT/JP2006/300797, filed on Jan. 20, 2006.

(30) Foreign Application Priority Data

Oct. 31, 2005 (JP) ............................. 2005-317723

(51) Int. Cl.
*G06F 12/00* (2006.01)
(52) U.S. Cl. ........................... 711/137; 711/3; 711/158
(58) Field of Classification Search .................. 711/137, 711/3, 158
See application file for complete search history.

(56) References Cited

U.S. PATENT DOCUMENTS

| 5,222,223 | A |   | 6/1993  | Webb, Jr. et al.              |
|-----------|---|---|---------|-------------------------------|
| 5,479,627 | A |   | 12/1995 | Khalidi et al.                |
| 5,948,095 | A | * | 9/1999  | Arora et al. ........... 712/200 |
| 5,956,756 | A |   | 9/1999  | Khalidi et al.                |
| 6,098,154 | A | * | 8/2000  | Lopez-Aguado et al. .... 711/137 |
| 6,119,218 | A | * | 9/2000  | Arora et al. ........... 712/207 |
| 6,138,212 | A | * | 10/2000 | Chiacchia et al. ......... 711/137 |
| 6,317,810 | B1 | * | 11/2001 | Lopez-Aguado et al. .... 711/120 |
| 6,490,658 | B1 |   | 12/2002 | Ahmed et al.                  |
| 6,628,294 | B1 |   | 9/2003  | Sadowsky et al.               |
| 7,305,526 | B2 | * | 12/2007 | Benhase et al. ........... 711/154 |

FOREIGN PATENT DOCUMENTS

| EP | 1139222   | 10/2001 |
|----|-----------|---------|
| JP | 62-151958 | 7/1987  |
| JP | 2-178750  | 7/1990  |
| JP | 2-285440  | 11/1990 |
| JP | 2-289013  | 11/1990 |

(Continued)

OTHER PUBLICATIONS

European Search Report issued on May 8, 2009 in corresponding European Patent Application 06712022.0.

(Continued)

*Primary Examiner*—Stephen C Elmore
(74) *Attorney, Agent, or Firm*—Staas & Halsey LLP

(57) ABSTRACT

In an information processing apparatus of this invention having a cache memory, a TLB and a TSB, a second retrieval unit retrieves a second physical address from an address translation buffer by using a second virtual address corresponding one-to-one to a first virtual address, and a prefetch controller enters a first address translation pair of the first virtual address from an address translation table into a cache memory by using a second physical address which is a result of the retrieval, thereby largely shortening the processing time of a memory access when a TLB miss occurs at the time of the memory access.

10 Claims, 11 Drawing Sheets

FOREIGN PATENT DOCUMENTS

| | | |
|---|---|---|
| JP | 3-36647 | 2/1991 |
| JP | 4-190440 | 7/1992 |
| JP | 7-200409 | 8/1995 |
| JP | 2000-112821 | 4/2000 |
| JP | 2001-290706 | 10/2001 |

OTHER PUBLICATIONS

English language International Search Report mailed May 23, 2006 in corresponding International Application No. PCT/JP2006/300797.

* cited by examiner

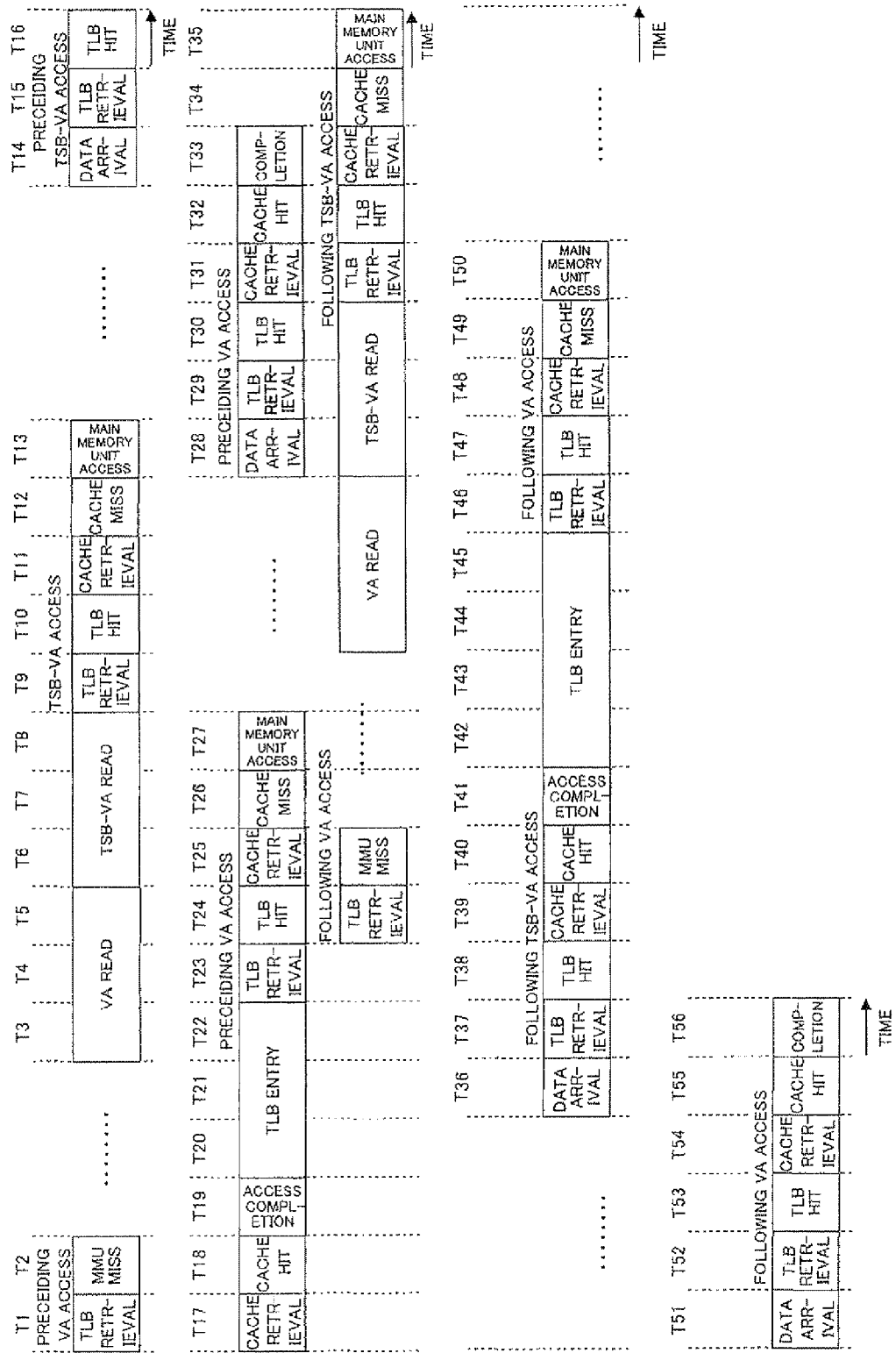

ARITHMETIC PROCESSOR, INFORMATION PROCESSING APPARATUS AND MEMORY ACCESS METHOD IN ARITHMETIC PROCESSOR

This application is a continuation application, filed under 35 USC 111(a), of International Application PCT/JP2006/300797, filed Jan. 20, 2006, and claims foreign priority benefit to Japanese application 2005-317723, filed Oct. 31, 2005, which are incorporated herein by reference in their entireties.

TECHNICAL FIELD

The present invention relates to an information processing apparatus having a cache memory such as an MMU (Memory Management Unit) or the like and a TLB (Translation Lookaside Buffer), in particular, relates to a technique for prefetching data into a cache memory when an MMU-MISS-TRAP (TLB miss) occurs.

BACKGROUND ART

Generally, since the operation speed of main memory unit is lower than that of CPU (Central Processing Unit) and a distance between the CPU and the main memory unit is large, it takes a long processing time for the CPU to obtain data from the main memory unit when a main memory unit access occurs.

For this reason, the current trend is toward a system equipped with a cache memory between an instruction computing unit executing and processing instruction control and arithmetic control in a CPU and a main memory unit.

Since the cache memory has a smaller storage capacity but operates at a higher speed than the main memory unit, and is closer to the instruction computing unit than the main memory unit, the instruction computing unit can fetch data in a much shorter time than accessing to the main memory unit.

Next, MMU (Memory Management Unit) will be mentioned. In an SPARC (registered trademark) architecture, for example, the OS (Operating System) manages a translation table to convert a virtual address into a physical address, and stores part of entries as entries each composed of a pair of a virtual address (TTE-Tag) called TTE (Translation Table Entry) and a physical address (TTE-Data) in a TSB (Translation Storage Buffer; address translation table) on the main memory unit.

Further, the OS stores part of these entries in a TLB (Translation Lookaside Buffer) in an MMU.

TSB has a large capacity but takes a long time to be accessed from the instruction computing unit, whereas TBL has a small capacity but can be accessed from the instruction computing unit at a high speed.

In a system having such TSB and TLB, when a designated virtual address is not registered on the TLB in the MMU, an MMU-MISS-TRAP (MMU miss; TLB miss) occurs.

On such occasion, the instruction computing unit reports the OS of this MMU-MISS-TRAP. The OS having received this report requires the instruction computing unit in the CPU to perform memory access processing, whereby the instruction computing unit in the CPU executes the memory access processing, as shown in a flowchart (steps S100 through S118) in FIG. 9 and a time chart (T1 through T33) in FIG. 10. Incidentally, each of T1 through T33 in FIG. 10 indicates processing unit time period by the instruction computing unit in the CPU.

In practice, the instruction computing unit starts a memory access based on a virtual address (step S100 in FIG. 9), and retrieves an entry which is a pair of the virtual address and a physical address corresponding to this virtual address from the TLB (refer to step S101 in FIG. 9 and T1 in FIG. 10).

Here, when the entry containing this virtual address is registered on the TLB (namely, when an MMU-MISS-TRAP does not occur; No route at step S102 in FIG. 9), the instruction computing unit performs retrieval from a cache memory by using the physical address in order to obtain data indicated by a physical address corresponding to the retrieved virtual address (step S103 in FIG. 9).

When a cache entry containing this data is registered on the cache memory (Yes route at step S104 in FIG. 9), the instruction computing unit reads the data, completes the memory access (step S105), and terminates the processing.

On the other hand, when a cache entry composed of a pair of the physical address and the data is not registered on the cache memory (No route at step S104 in FIG. 9), the instruction computing unit has a main memory unit access by using the physical address, enters data at this physical address into the cache memory (step S106 in FIG. 9), and again starts processing by using the virtual address (step S107 in FIG. 9; namely, returns to the above step S100).

By the way, when the entry of a pair of the retrieved virtual address is not registered on the TLB (that is, when an MMU-MISS-TRAP occurs; refer to Yes route at step S102 in FIG. 9 and T2 in FIG. 10), the OS having received a report of MMU-MISS-TRAP requires the instruction computing unit to perform a process from steps S108 to S118 to be described later in FIG. 9.

In practice, the instruction computing unit sets the virtual address at which the MMU miss occurs in the register, generates a virtual address on the TSB (hereinafter referred to as a TSB virtual address) corresponding to the virtual address on the basis of this virtual address, sets the TSB virtual address in the register, then reads the virtual address and the TSB virtual address (refer to steps S108 and S109 in FIG. 9 and T3 to T8 in FIG. 10).

Incidentally, a process of setting the virtual address in the register and a process of generating a TSB virtual address and setting the TSB virtual address in the register are executed during a time period between T2 to T3 in FIG. 10.

Next, a relationship between a virtual address and a TSB virtual address will be mentioned. As described above, an entry composed of a pair of a virtual address and a TSB virtual address is retained in a TSB on a main memory unit, an address on the TSB at which the entry of the pair of the virtual address and the physical address is retained is a TSB physical address, and a virtual address corresponding to this TSB physical address is a TSB virtual address. Further, in this MMU, an entry of a pair of the TSB virtual address and the TSB physical address is registered on and retained in a TLB.

The instruction computing unit then starts a memory access by using a read TSB virtual address (step S110 in FIG. 9), and retrieves an entry of a pair of the TSB virtual address and a TSB physical address corresponding to this virtual address from the TLB (refer to step S111 in FIG. 9 and T9 in FIG. 10). When the entry is retrieved from the TLB (when the entry is hit) (refer to step S112 in FIG. 9 and T10 in FIG. 10), the instruction computing unit performs retrieval from the cache memory by using this TSB physical address (refer to step S113 in FIG. 9 and T11 in FIG. 10).

Here, when an entry of a pair of the TSB physical address and data (TTE-TAG/Data; a pair of a virtual address and a physical address) retained on the main memory unit indicated by this TSB physical address is retrieved (hit) from the cache memory (Yes route at step S114 in FIG. 9), the retrieved entry is entered into the TLB (step S115 in FIG. 9), whereby an entry of a pair of the virtual address, which has been retrieved at the above step S101 and at which the MMU miss has occurred at the above step S102, and a physical address corresponding to this virtual address is entered into the TLB. The instruction computing unit again starts a memory access by using this virtual address (step S116 in FIG. 9; namely, returns to the above step S100).

On the other hand, when a cache entry of a pair of the TSB physical address and data is not registered on the cache memory (that is, when a cache memory miss occurs; refer to No route at step S114 in FIG. 9 and T12 in FIG. 10), the instruction computing unit has an access to the main memory unit by using the TSB physical address (refer to step S117 in FIG. 9 and T13 in FIG. 10), reads a pair of this TSB physical address and data from the main memory unit, enters the pair of the physical address and data into the cache memory (refer to T14 in FIG. 10), and again starts a memory access by using this TSB physical address (refer to step S118 in FIG. 9 and T15 and the following process in FIG. 10; namely, returns to the above step S110).

Meanwhile, the process at T15 to T22 in FIG. 10 corresponds to the above-described steps S110 to S116 in FIG. 9, the process at T23 to T28 in FIG. 10 corresponds to the above-described steps S100 to S104, S106 and S107 in FIG. 9, and the process at T29 to T33 in FIG. 10 corresponds to the above-described steps S100 to S105 in FIG. 9.

There have been proposed various kinds of techniques coping with occurrence of a translation miss (TLB miss) in TLB (refer to patent documents 1 to 3 below, for example).

Patent Document 1: Japanese Patent Application Laid-Open Publication No. 2000-112821
Patent Document 2: Japanese Patent Application Laid-Open Publication No. H02-285440
Patent Document 3: Japanese Patent Application Laid-Open Publication No. H02-178750

DISCLOSURE OF INVENTION

Problems to be Solved by the Invention

In the known MMU, when an MMU-MISS-TRAP occurs because an entry of a pair of the retrieved virtual address is not registered in the TLB, the instruction computing unit performs the following processes (1) to (6) under control of the OS:

(1) Report MMU-MISS-TRAP to the OS;
(2) Read a designated virtual address from the register;
(3) Read a TSB virtual address generated on the basis of the virtual address from the register;
(4) Execute a memory access by using the TSB virtual address;
(5) Enter TTE-TAG/Data (a pair of a virtual address and a physical address) into TLB if data relating to the TSB virtual address exists in the cache memory or the main memory unit; and
(6) Again execute a memory access to a designated virtual address.

In the above process (5), if the data does not exist in the cache memory, a memory access to the main memory unit has occurred, which takes a considerable time. Therefore, it takes a long time to complete the whole processes (1) to (6)

As shown in FIG. 10, according to the known technique, the OS sets a virtual address in the register after generating the TSB virtual address, reads the set TSB virtual address from the register (refer to T6 to T8), retrieves from the cache memory by using a TSB physical address obtained on the basis of the TSB virtual address (refer to T11), and, when data does not exist in the cache memory (refer to T12) starts an access to the main memory (refer to T13). As this, in the known technique, a longtime is elapsed before an access to the main memory unit is started after generation of the TSB virtual address.

In other words, in the known technique, although a TSB virtual address is generated during T2 and T3, a main memory unit access is not started until a timing of T13 after a cache miss is revealed as a result, hence the known technique has a problem that a long time has elapsed until data (here, TTE corresponding to a TSB physical address) reaches the cache memory.

Further, in the known technique, although TTE corresponding to a TSB physical address arrives at a timing of T14, fetching data retained at this TTE physical address (TTE-Data) is not executed until a timing of T27 even after a cache miss is revealed as a result, as shown in FIG. 10, hence the known technique has a problem that a long time has elapsed until the data reaches the cache memory.

Still further, when TLB miss occurs in both a preceding memory access and a following memory access in the case of successive accesses, the processes described in (1) to (6) above cannot be executed for the following memory access until the processes described in (1) to (6) for the preceding memory access are not completed.

In other words, as shown in a time chart (T1 to T56) in FIG. 11, when the TLB miss successively occurs in successive memory accesses, the following memory access is not started (refer to T24) until a process of entering a virtual address (refer to T1 to T22) at which a TLB miss occurs in the preceding memory access is not completed. For this reason, when a TLB miss occurs in the following memory access as well, it takes a long time to complete the following memory access (refer to T56). Incidentally, contents of process for the preceding memory access (T1 to T33) are similar to contents of process (T1 to T33) for a memory access shown in FIG. 10, and process for the following memory access (T24 to T56) in FIG. 11 differs only in address to be processed, contents of which are similar to those of the process (T1 to T33) for the preceding memory access.

In light of the above problems, an object of the present invention is to largely shorten the processing time of a memory access when a TLB miss occurs at the time of the memory access, and largely shorten the processing time of successive memory accesses when TLB miss successively occurs in these successive memory accesses, in an information processing apparatus having a cache memory, a TLB and a TSB.

Means for Solving the Problems

To attain the above object, an arithmetic processor of this invention connected to a memory unit as an address translation table retaining a first address translation pair which is a pair of a first physical address at which data is retained and a first virtual address corresponding to the first physical address, the arithmetic processor comprises: a cache memory; an address translation buffer retaining a second address translation pair which is a pair of a second physical address indicating an address at which the first address translation pair is retained in the memory unit and a second virtual address corresponding to the second physical address, and being able to retain the first address translation pair; a first retrieval unit retrieving the first physical address from the address translation buffer by using the first virtual address; a second retrieval unit retrieving the second physical address from the address translation buffer by using the second virtual address corresponding one-to-one to the first virtual address; and a prefetch controller entering the first address translation pair of the first virtual address from the address translation table into the cache memory by using the second physical address retrieved by the second retrieval unit.

The arithmetic processor of this invention further comprises: a virtual address generator; wherein, when the first address translation pair corresponding to the first virtual address is not retained in the address translation buffer, the virtual address generator generates the second virtual address corresponding one-to-one to the first virtual address.

In the arithmetic processor of this invention, the first retrieval unit, the virtual address generator, the second retrieval unit and the prefetch controller are under a pipeline control; and the first retrieval unit, the virtual address generator, the second retrieval unit and the prefetch controller sequentially execute processes in response to successive instructions.

In the arithmetic processor of this invention, the prefetch controller comprises: a first prefetch controller retrieving the first address translation pair from the address translation table by using the second physical address, and entering a set of the second physical address and the retrieved first address translation pair into the cache memory; and a second prefetch controller, when the address translation buffer starts to enter the first address translation pair, entering data retained at the first physical address from the memory unit into the cache memory on the basis of the first physical address contained in the first address translation pair.

An information processing apparatus of this invention comprises: a memory unit as an address translation table retaining a first address translation pair which is a pair of a first physical address at which data is retained and a first virtual address corresponding to the first physical address; a cache memory; an address translation buffer retaining a second address translation pair which is a pair of a second physical address indicating an address at which the first address translation pair is retained in the memory unit and a second virtual address corresponding to the second physical address, and being able to retain the first address translation pair; a first retrieval unit retrieving the first physical address from the address translation buffer by using the first virtual address; a second retrieval unit retrieving the second physical address from the address translation buffer by using the second virtual address corresponding one-to-one to the first virtual address; and a prefetch controller entering the first address translation pair of the first virtual address from the address translation table into the cache memory by using the second physical address retrieved by the second retrieval unit.

The information processing apparatus of this invention further comprises: a virtual address generator; wherein, when the first address translation pair corresponding to the first virtual address is not retained in the address translation buffer, the virtual address generator generates the second virtual address corresponding one-to-one to the first virtual address.

In the information processing apparatus of this invention, the first retrieval unit, the virtual address generator, and the second retrieval unit and the prefetch controller are under a pipeline control; and the first retrieval unit, the virtual address generator, the second retrieval unit and the prefetch controller sequentially execute processes in response to successive instructions.

In the information processing apparatus of this invention, the prefetch controller comprises: a first prefetch controller retrieving the first address translation pair from the address translation table by using the second physical address, and entering a set of the second physical address and the retrieved first address translation pair into the cache memory; and a second prefetch controller, when the address translation buffer starts to enter the first address translation pair, entering data retained at the first physical address from the memory unit into the cache memory on the basis of the first physical address contained in the first address translation pair.

A memory access method in an arithmetic processor of this invention comprises the steps of: retaining a first address translation pair which is a pair of a first physical address at which data is retained and a first virtual address corresponding to the first physical address in a memory unit as an address translation table; retaining a second address translation pair which is a pair of a second physical address indicating an address at which the first address translation pair is retained and a second virtual address corresponding to the second physical address, and retaining the first address translation pair; retrieving the first physical address from the address translation buffer means by using the first virtual address; retrieving the second physical address from the address translation buffer means by using the second virtual address corresponding one-to-one to the first virtual address; and entering the first address translation pair of the first virtual address from the address translation table into a cache memory by using the second physical address which is a result of the retrieval.

Further, in the memory access method in an arithmetic processor of this invention, the step of retaining the first address translation pair comprises a step of: entering data retained at the first physical address from the memory unit into the cache memory on the basis of the first physical address contained in the first address translation pair.

EFFECTS OF THE INVENTION

According to the arithmetic processor, information processing apparatus, and memory access method in arithmetic processor, in the normal process coping with a TLB miss, before a main memory unit access is executed in order to obtain a TTE as an entry which is a pair of a virtual address (TTE-Tag) and a physical address (TTE-Data), the first prefetch controller executes the main memory unit access earlier than usual. Whereby, a timing at which the first address translation pair reaches the cache memory can be moved up, which can largely shorten the processing time of a memory access in which the TLB miss occurs.

Since this process is executed before a process responsive to a request from the OS is executed owing to the pipeline process, even when successive instructions both encounter the TLB miss, the memory access process for the preceding instruction and the memory access process for the following instruction can be sequentially executed without waiting for termination of the memory access process for the preceding instruction. This enables the prefetch process for the following instruction by the first prefetch controller to be executed earlier than usual. As a result, it becomes possible to retain data (the above-described TTE or data corresponding to the first physical address) in early stage, and to largely shorten the processing time of successive memory accesses even when the TLB misses occur in successive memory accesses.

At the same time that the entering unit starts to enter the above-mentioned TTE into the TLB, the second prefetch controller (data prefetch controller) performs prefetch to fetch data retained at an address indicated by a first physical address contained in the TTE from the main memory unit into the cache memory on the basis of the first physical address. As this, the second prefetch controller executes the main memory unit access before executing the same in response to a request from the OS, which can largely shorten the processing time of the relevant memory access.

BRIEF DESCRIPTION OF DRAWINGS

FIG. 11 A time chart showing an example of a procedure of the operation of the information processing apparatus equipped with the known MMU.

Figure 1:
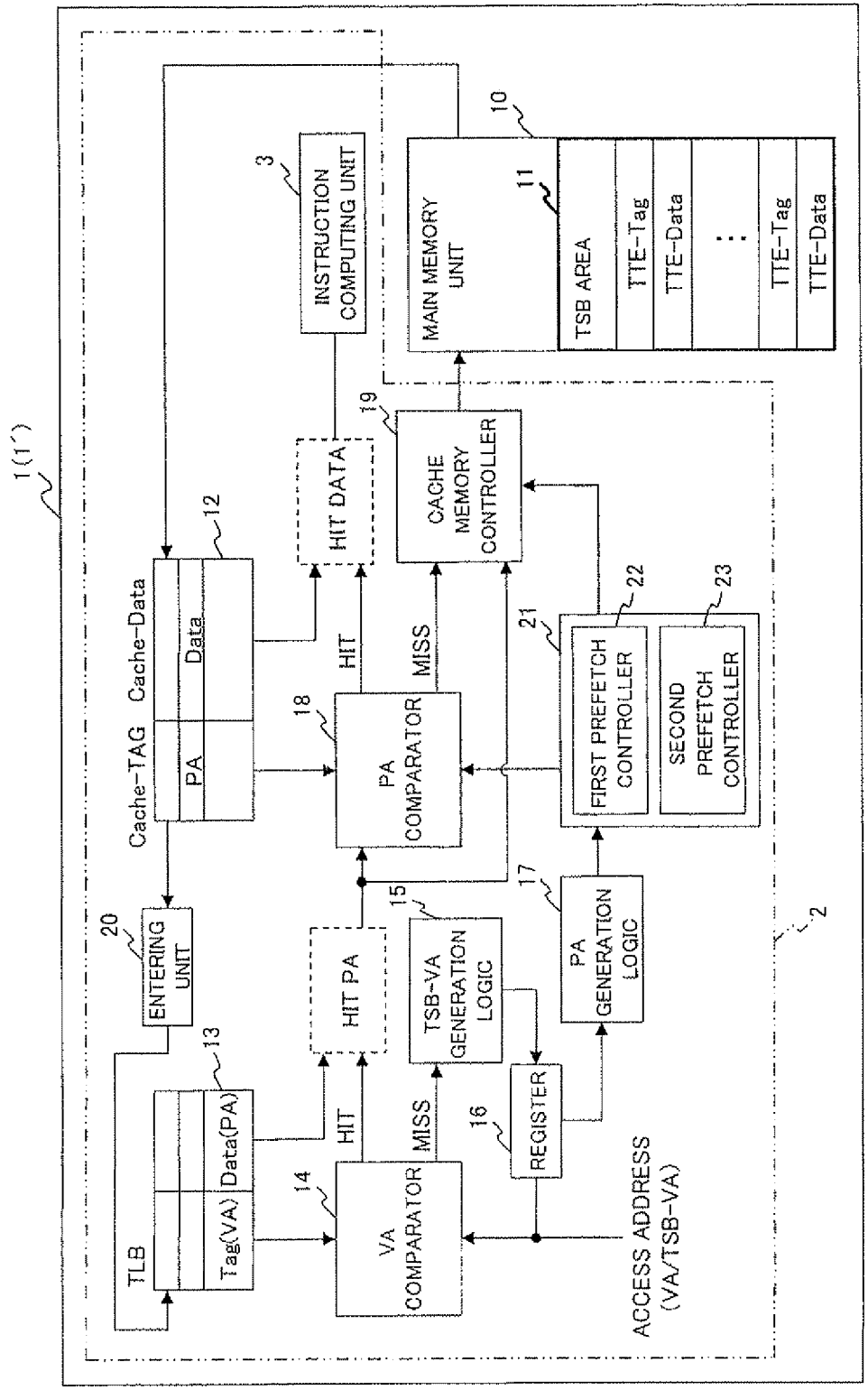
FIG. 1 A block diagram showing configurations of information processing apparatuses as a first and second embodiments of this invention.

EXPLANATION OF NUMERALS 1,1' . . . information processing apparatus
10 . . . main memory unit
11 . . . TSB (Translation Storage Buffer; TSB area; address translation table)
12 . . . cache memory
13 . . . TLB (Translation Lookaside Buffer; address translation buffer)
14 . . . VA (Virtual Address) comparator (first retrieval unit; second retrieval unit; retrieval unit)
15 . . . TSB-VA generator (first generator)
16 . . . register
17 . . . PA (Physical Address) generation logic (generator; second generator)
18 . . . PA comparator (cache memory retrieval unit)
19 . . . cache memory controller
20 . . . entering unit
21 . . . prefetch controller
22 . . . first prefetch controller
23 . . . second prefetch controller (data prefetch controller)

BEST MODES FOR CARRYING OUT THE INVENTION

Hereinafter, modes for carrying out the present invention will be described with reference to the drawings.

[1] As to a First embodiment of the Invention

First, a configuration of an information processing apparatus according to a first embodiment of this invention will be described with reference to a block diagram shown in FIG. 1. As shown in FIG. 1, the information processing apparatus 1 has a main memory unit 10, and a processing unit 2 including for example, an instruction computing unit 3, a cache memory 12, a TLB 13, a VA (Virtual Address) comparator (first retrieval unit; second retrieval unit; retrieval unit) 14, a TSB-VA generation logic (first generation unit) 15, a register 16, a PA (Physical Address) generation logic (generation unit; second generation unit) 17, a PA comparator (cache memory retrieval unit) 18, a cache memory controller 19, an entering unit 20 and a prefetch controller 21.

The main memory unit 10 retains data relating to an instruction to be executed by the instruction computing unit 3 executing the instruction, and has a TSB (Translation Storage Buffer; address translation table, hereinafter referred to as a TSB area) 11 retaining an entry of an address translation pair (first address entry; TTE) composed of a physical address (first physical address; TTE (Translation Table Entry)-Data) indicating an address at which the data is retained and a virtual address (first virtual address; TTE-Tag) corresponding to this physical address.

The cache memory 12 is mounted between the instruction computing unit 3 and the main memory unit 10 to temporarily retain data.

The TLB 13 retains an entry (second address entry; hereinafter referred to as a TSB address entry) that is an address translation pair composed of a physical address (second physical address; hereinafter, referred to as a TSB physical address) indicating an address at which an entry that is an address translation pair in the TSB area 11 and a virtual address (second virtual address; hereinafter, referred to as a TSB virtual address) corresponding to this TSB physical address, and also, is composed to be able to retain the address translation pair (first address entry)

In the following description, simply mentioned "virtual address" indicates first virtual address, simply mentioned "physical address" indicates first physical address, and simply mentioned "address translation pair" indicates first address entry, as stated above. On the other hand, in the following description, second physical address is referred to as "TSB physical address", second virtual address is referred to as "TSB virtual address", and second address entry is referred to as "TSB address entry".

Now, description will be made of a data retaining method in the cache memory 12 and the TLB 13.

When retaining a cache entry that is a pair of a physical address and data retained at an address on the main memory unit 10 indicated by this physical address, the cache memory 12 retains the physical address as "Cache-Tag" that is a retrieval tag, and retains relevant data as "Cache-data" that is data to be retrieved.

When retaining an address translation pair (TTE) of a TSB physical address and data retained at an address in the TSB area 11 indicated by this TSB physical address, the cache memory 12 retains the TSB physical address as "Cache-Tag", and retains the address translation pair as "Cache-data".

When retaining an address translation pair composed of a virtual address and a physical address, the TLB 13 retains the virtual address as "Tag" that is a retrieval tag, and retains the physical address that is "Data" as data to be retrieved.

Further, when retaining a TSB address entry composed of a TSB virtual address and a TSB physical address, the TLB 13 retains the TSB virtual address as "Tag" that is used as an index for retrieval, and retains the TSB physical address as "Data" that is an object of retrieval.

As shown in FIG. 1, the VA comparator 14 retrieves a TSB address entry that is an address translation pair of a virtual address (denoted as "access address" in the drawing) to be processed by the instruction computing unit 3 from the TLB 13 on the basis of this virtual address.

At the same time that a TSB virtual address corresponding one-to-one to this access address is generated by the TSB-VA generation unit 15, the VA comparator 14 retrieves a TSB address entry of this generated TSB virtual address from the TLB 13 on the basis of the TSB virtual address.

When it is found as a result of retrieval by the VA comparator 14 that an address translation pair of $ the virtual address to be processed is not retained in the TLB 13, the TSB-VA generation logic (hereinafter referred to as a TSB-VA generation unit) 15 generates a TSB virtual address corresponding one-to-one to this virtual address.

The register 16 temporarily retains a virtual address at which a TLB miss occurs, or a TSB virtual address generated by the TSB-VA generation unit 15.

The PA generation logic (hereinafter referred to as a PA generation unit) 17 generates an ultimate TSB physical address indicating a real address in the TSB area 11 on the basis of a TSB physical address corresponding to the TSB virtual address obtained as a result of retrieval from the TLB 13 by the VA comparator 14, at which the TLB miss occurs. The PA generation unit 17 generates the ultimate physical address at the same time the retrieval by the VA comparator 14 is completed.

For example, the PA generation unit 17 adds a part of the above-mentioned TSB virtual address, at which a TLB miss occurs, to a TSB physical address corresponding to this TSB virtual address, thereby generating an ultimate physical address.

Further, the PA generation unit 17 generates an ultimate physical address indicating a real address on the main memory unit 10 corresponding to this virtual address on the basis of a physical address read out from the TSB area 11 after the TLB miss occurs and a virtual address corresponding to this physical address.

For example, the PA generation unit 17 adds a part of a virtual address to a physical address, thereby generating such ultimate physical address.

The PA comparator 18 retrieves data retained in the cache memory 12. On the basis of a physical address, the PA comparator 18 retrieves data retained at an address on the main memory unit 10 indicated by this physical address.

Further, on the basis of a TSB physical address, the PA comparator 18 retrieves an address translation pair that is an entry retained at an address in the TSB area 11 indicated by this physical address.

The cache memory controller 19 controls the cache memory 12. When it is found as a result of retrieval by the PA comparator 18 that a cache entry to be retrieved is not retained in the cache memory 12, the cache memory controller 19 reads data to be retrieved from the main memory unit 10, and retains the data as a cache entry in the cache memory 12.

The entering unit 20 enters an address translation pair into the TLB 13, out of cache entries retained in the cache memory 12. In this information processing apparatus 1, TSB address entries are managed by the OS (Operating System), and are beforehand retained in the TLB 13.

The prefetch controller 21 has a first prefetch controller 22 and a second prefetch controller (data prefetch controller) 23.

The first prefetch controller 22 prefetches an address translation pair of a virtual address to be processed at which a TLB miss occurs from the TSB area 11 of the main memory unit 10 into the cache memory 12 by using an ultimate TSB physical address, which is generated by the PA generation unit 17 at the same time that a TSB physical address corresponding to a TSB virtual address is retrieved by the VA comparator 14.

Figure 2:
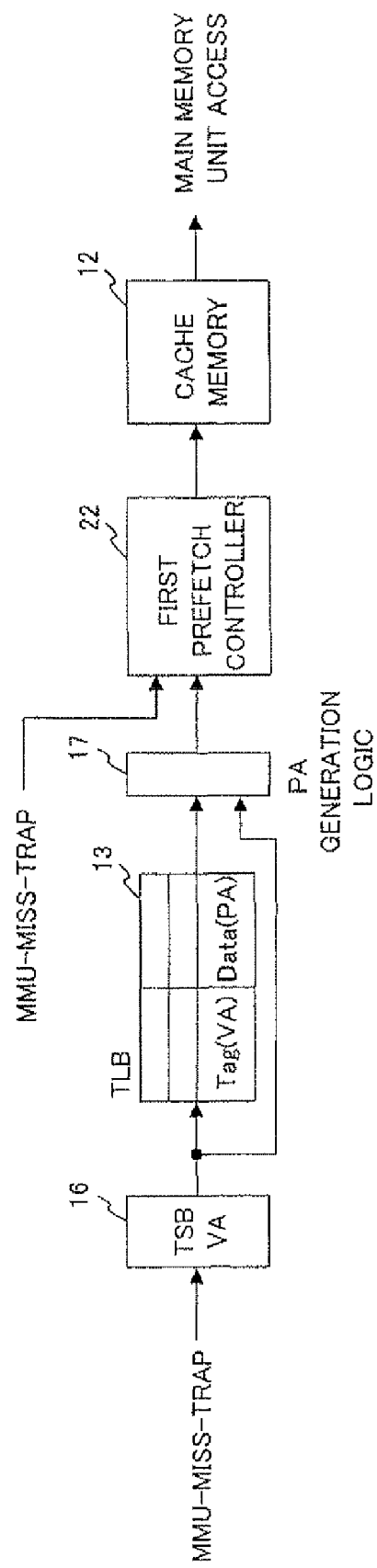
FIG. 2 A block diagram showing an essential configuration of the information processing apparatus as the first embodiment of this invention.

Now, the first prefetch controller 22 will be described in more detail with reference to FIGS. 1 and 2. At the same time that a TSB physical address corresponding to a TSB virtual address set in the register 16 is retrieved from the TLB 13 by the VA comparator 14, the first prefetch controller 22 causes the PA comparator 18 to retrieve a cache entry that is a pair of a TSB physical address and an address translation pair retained at an address in the TSB area 11 indicated by this TSB physical address from the cache memory 12 on the basis of the retrieved TSB physical address.

In other words, when an ultimate TSB physical address is generated by the PA generation unit 17, the first prefetch controller 22 causes the PA comparator 18 to retrieve from the cache memory by using this ultimate physical address.

When it is found as a result of retrieval by the PA comparator 18 that a cache entry that is a pair of a TSB physical address and an address translation pair is not retrieved from the cache memory 12 (that is, when a cache entry is not retained in the cache memory 12), the first prefetch controller 22 causes the cache memory controller 19 to enter a pair of a TSB physical address and an address translation pair as a cache entry into the cache memory 12.

In other words, the first prefetch controller 22 controls the cache memory 19 to read an address translation pair from the TSB area 11 of the main memory unit 10 on the basis of a relevant ultimate physical address, and causes the cache memory to retain a pair of a TSB physical address and the read address translation pair as a cache entry.

At the same time that the entering unit 20 starts to enter an address translation pair of a virtual address at which a TLB miss occurs into the TLB 13, the second prefetch controller 23 prefetches, on the basis of a physical address of the address translation pair, data retained at this physical address from the main memory unit 10 into the cache memory 12 only when a cache miss occurs.

In this information processing apparatus 1, at least the TSB-VA generation logic 15, the register 16, the PA generation logic 17, the PA comparator 18, the cache memory controller 19 and the entering unit 20 together function as a first address entry entering unit which, when it is found as a result of retrieval by the retrieval unit 14 that an address translation pair of a virtual address at which a TLB miss occurs is not retained in the TLB 13, enters an address translation pair corresponding to the virtual address into the TLB 13 on the basis of a TSB address entry of a TSB virtual address corresponding one-to-one to this virtual address. The first prefetch controller 22 of the prefetch controller 21 may function as the first address entry entering unit.

Figure 3:
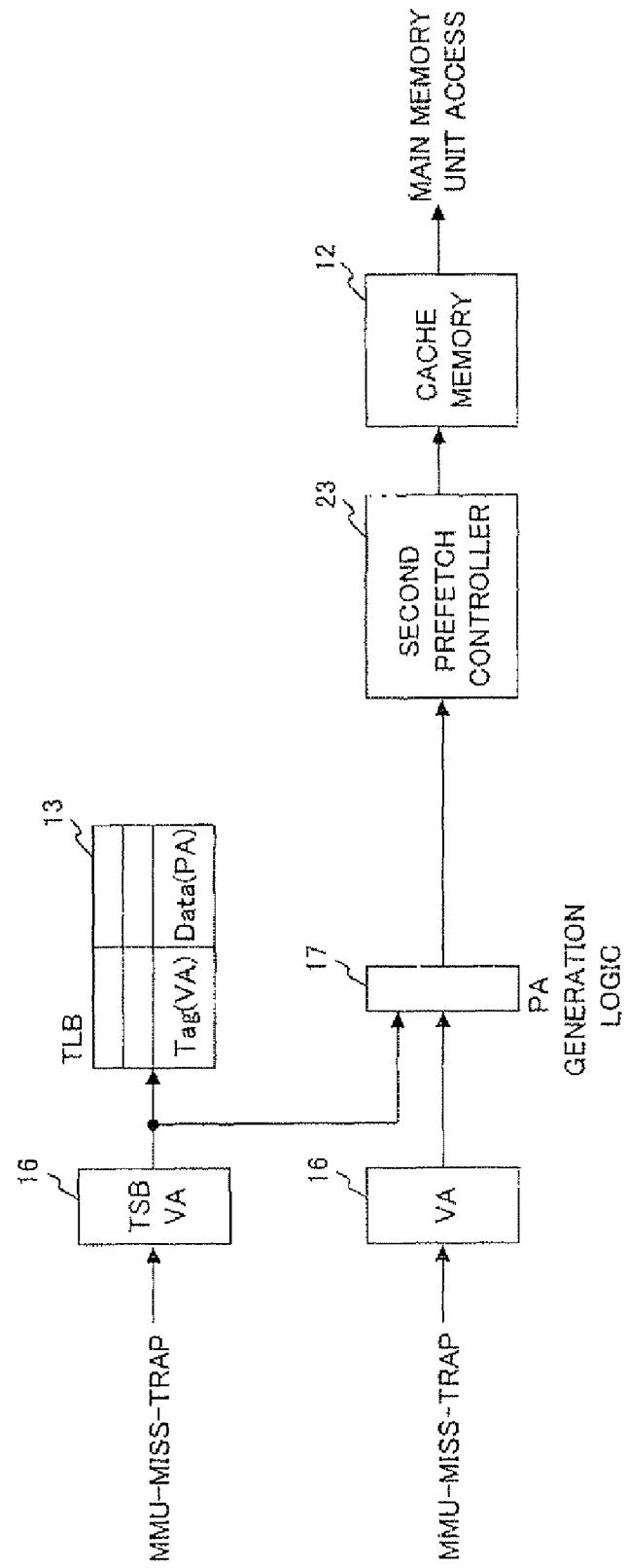
FIG. 3 A block diagram showing an essential configuration of the information processing apparatus as the first embodiment of this invention.

Now, the second prefetch controller 23 will be explained in more detail with reference to FIGS. 1 and 3. When it is found as a result of retrieval by the VA comparator 14 that an address translation pair of a virtual address to be processed is not retained into the TLB 13, at the same time that the TSB-VA generation unit 15, the register 16, the PA generation unit 17, the PA comparator 18, the cache memory controller 19, the entering unit 20 and the first prefetch controller 22 together function as the first address entry entering unit start to enter an address translation pair of this virtual address in the TLB 13, the second prefetch controller 23 prefetches data at an address indicated by a physical address of this address translation pair only when a cache miss occurs at the cache memory 12.

Triggered by a start of entering of an address translation pair into the TLB 13 by the entering unit 20, the second prefetch controller 23 controls and causes the cache memory controller 19 to read data retained at an address on the main memory unit 10 indicated by a physical address on the basis of this physical address of the address translation pair, and to enter the data into the cache memory 12.

Now, an operation (prefetch control method) of this information processing apparatus 1 will be described with reference to a flowchart (steps S10 to S32) shown in FIG. 4 and a time chart (t1 to t40) shown in FIG. 5. Incidentally, each of t1 to t40 in FIG. 5 indicates processing unit time period of the information processing apparatus 1.

Figure 4:
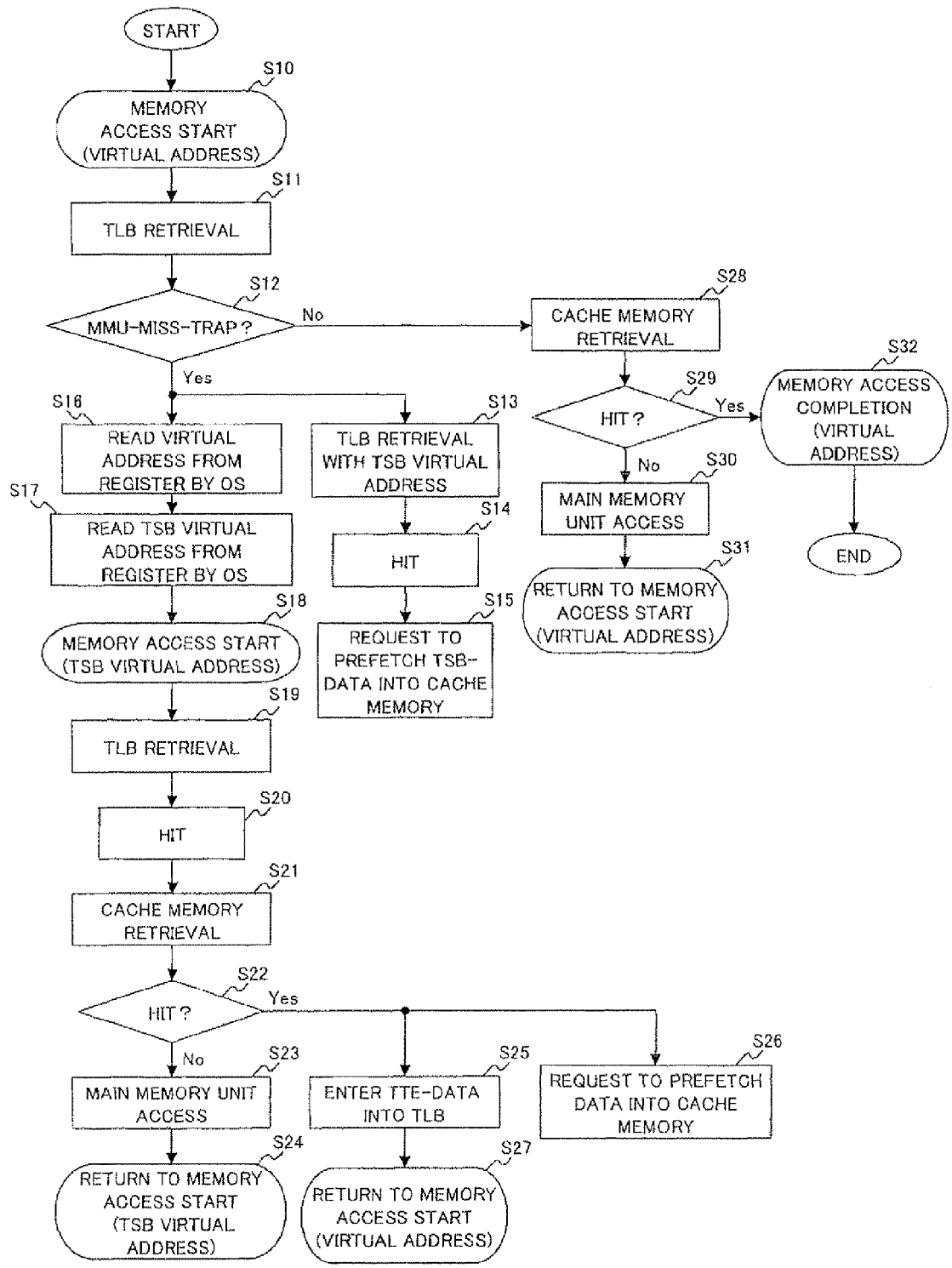
FIG. 4 A flowchart for illustrating a procedure of a prefetch control method as the first embodiment of this invention.

First, the instruction computing unit 3 starts a memory access based on a virtual address (step S10 in FIG. 4). The VA comparator 14 retrieves an address translation pair composed of the virtual address and a physical address corresponding to this virtual address from the TLB 13 (step S11 in FIG. 4, refer to t1 in FIG. 5; first retrieval step).

When this address translation pair is not registered on the TSB 13 (that is, when an MMU-MISS-TRAP occurs; Yes route at step S12 in FIG. 4, refer to t2 in FIG. 5), the instruction computing unit 3 reports this MMU-MISS-TRAP to the OS, and the TSB-VA generation unit 15 generates a TSB virtual address (TSB-VA) corresponding one-to-one to the virtual address on the basis of this virtual address at which the TLB miss occurs (refer to t3 in FIG. 5; first generation step).

Figure 5:
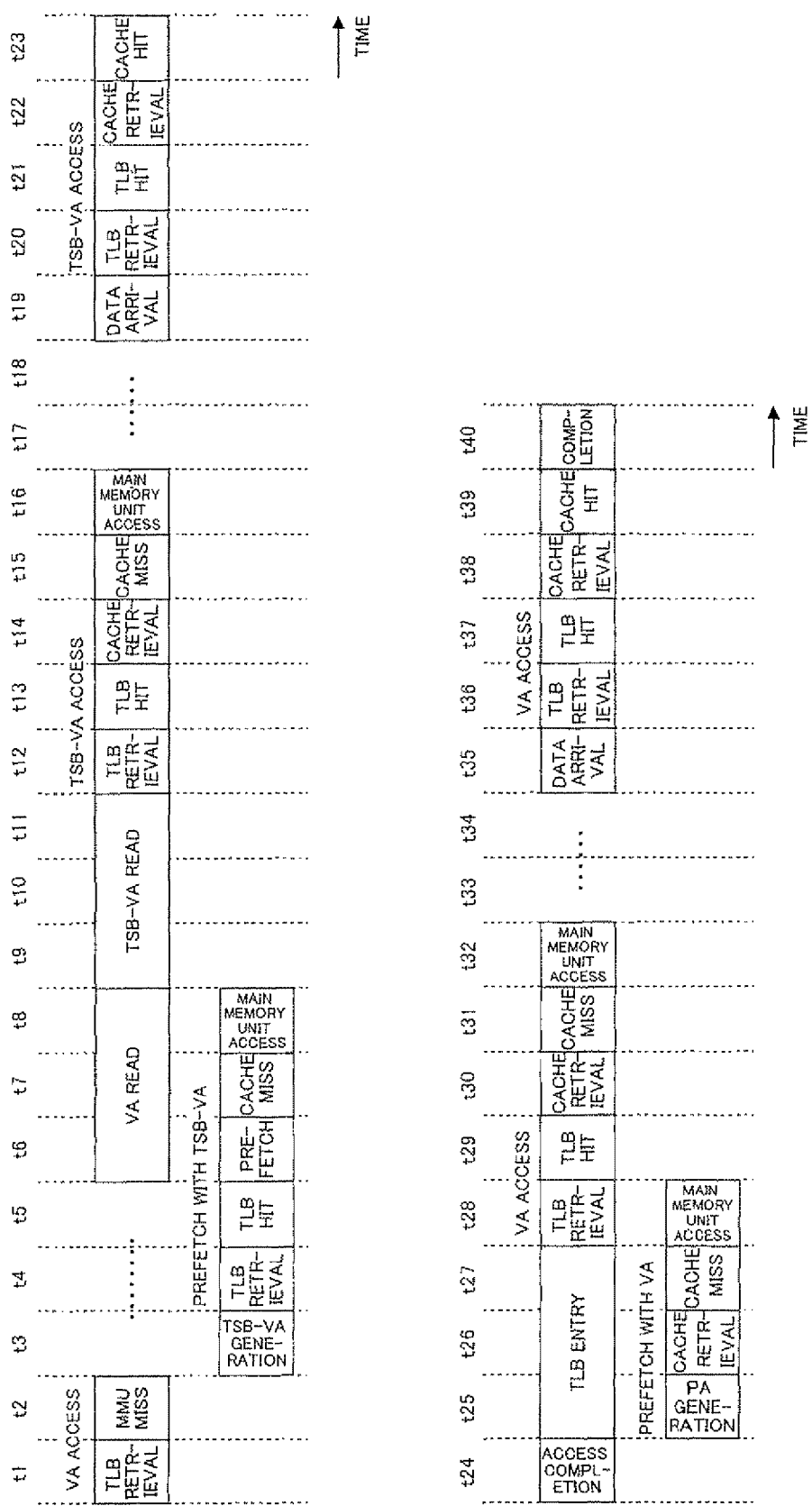
FIG. 5 A time chart showing an example of the procedure of the prefetch control method as the first embodiment of this invention.

During t3 to t5 in FIG. 5, the OS temporarily sets the virtual address and the generated TSB virtual address in the register 16.

At the same time that the TSB virtual address is generated by the TSB-VA generation unit 15 (that is, as soon as the TSB virtual address is generated), the VA comparator 14 retrieves a TSB address entry of the generated TSB virtual address from the TBL 13 (step S13 in FIG. 4, refer to t4 in FIG. 5; second retrieval step).

At the same time that the TSB address entry is retrieved from the TLB 13 by the VA comparator 14 (that is, when a TLB-HIT occurs; step S14 in FIG. 4, refer to t5 in FIG. 5) (that is, as soon as the TSB address entry is retrieved by the VA comparator 14), the first prefetch controller 22 prefetches an address translation pair (TTE-Data) of the virtual address at which the TLB miss occurs from the TSB area 11 of the main memory unit 10 into the cache memory 12 by using the retrieved TSB physical address (step S15 in FIG. 4, refer to t6 to t8 in FIG. 5; first prefetch control step).

In the first prefetch control step, the PA comparator 18 retrieves the address translation pair from the cache memory 12 on the basis of a signal from the first prefetch control unit 22 (cache memory retrieval step). When it is found as a result of retrieval that the address translation pair is not retained in the cache memory 12 (when a cache miss occurs) (refer to t7 in FIG. 5), the cache memory controller 19 starts an access to the TSB area 11 of the main memory unit 10 on the basis of a signal from the first prefetch controller 22 in order to prefetch a pair of a TSB physical address and the address translation pair into the cache memory 12 (refer to t8 in FIG. 5). When receiving this address translation pair, the cache memory controller 19 causes the cache memory 12 to retain the address translation pair and the TSB physical address as a cache entry (retaining step). However, in the example shown in FIG. 5, this address translation pair is received after a normal process (t12 to t16 in FIG. 5) based on a request from the OS to be described later. Therefore, in the example in FIG. 5, the retaining step is executed at a timing of t19.

In the information processing apparatus 1, at the same time that the first prefetch controller 22 starts to prefetch, a normal process coping with a TLB miss based on a request from the OS is started (refer to t6 in FIG. 5).

Namely, the instruction computing unit 3 reads a virtual address at which the TLB miss occurs from the register 16 on the basis of a request from the OS (step S16 in FIG. 4, refer to t6 to t8 in FIG. 5), and reads out a TSB virtual address generated by the TSB-VA generation unit 15 from the register (step S17 in FIG. 4, refer to t9 to t11 in FIG. 5).

A memory access is started, using the read TSB virtual address (step S18 in FIG. 4). The VA comparator 14 retrieves a TSB physical address corresponding to the TSB virtual address from the TLB 13 on the basis of this TSB virtual address (step S19 in FIG. 4, refer to t12 in FIG. 5).

When the TSB physical address is retrieved (when a TLB hit occurs; step S20 in FIG. 4, refer to t13 in FIG. 5), the PA comparator 18 retrieves, on the basis of the retrieved TSB physical address, this TSB physical address and an address translation pair (TTE-Data) corresponding to the TSB physical address from the cache memory 12 (step S21 in FIG. 4, refer to t14 in FIG. 5).

When it is found as a result of retrieval by the PA comparator 18 that a pair of the TSB physical address and the address translation pair is not retained in the cache memory 12 (that is, when a cache miss occurs; No route at step S22 in FIG. 4, refer to t15 in FIG. 5), the cache memory controller 19 has an access to the TSB area 11 of the main memory unit 10 in order to fetch a pair of the TSB physical address and the address translation pair into the cache memory 12 (step S23 in FIG. 4, refer to t16 in FIG. 5).

As stated above, in the information processing apparatus 1, before a process (S36 to S23 in FIG. 4, refer to t12 to t16 in FIG. 5) coping with a TLB miss based on a request from the OS having been reported of an MMU-MISS-TRAP is executed, the VA comparator 14 and the first prefetch controller 22 execute the prefetch process (steps S13 to S15 in FIG. 4, refer to t4 to t7 in FIG. 5) as soon as a TSB virtual address is generated by the TSB-VA generation unit 15 in order to cause the cache memory 12 to retain an address translation pair of a virtual address at which the TLB miss occurs. Accordingly, it is possible to execute an access to the main memory unit 10 earlier by a time period equal to eight ts (eight processing unit periods) than the normal process based on a request from the OS (refer to t8 in FIG. 5).

Therefore, a timing at which the address translation pair arrives at the cache memory 12 and is entered into the cache memory 12 can be earlier than when only the normal process is executed, which can shorten the processing time when a TLB miss occurs.

When an address translation pair reaches the cache memory 12 after a main memory unit access (step S23 in FIG. 4, refer to t16 in FIG. 5) based on a request from the OS is executed, a pair of this address translation pair and a TSB physical address corresponding to the address translation pair is registered as a cache entry into the cache memory 12 (refer to t19 in FIG. 5; retaining step), and a memory access by using the TSB virtual address generated by the TSB-VA generation unit 15 is again started (refer to step S24 in FIG. 4). Namely, the procedure returns to step S18 in FIG. 4.

The VA comparator 14 again retrieves from the TLB 13 on the basis of the TSB virtual address corresponding one-to-one to the virtual address generated by the TSB-VA generator 15 at which the TLB miss occurs (steps S19 and S20; refer to t20 and t21 in FIG. 5). The PA comparator 18 retrieves an address translation pair (TTE-Date) of the virtual address at which the TLB miss occurs from the cache memory 12 by using a hit TSB physical address (step S21 in FIG. 4, refer to t22 in FIG. 5).

Since a pair of this TSB physical address and the address translation pair is already registered as a cache entry on the cache memory 12 at the above step S23 (that is, refer to t19 in FIG. 5; retaining step), a cache entry that is a pair of this TSB physical address and the address translation pair is hit in this retrieval by the PA comparator 18 (Yes route at step S22 in FIG. 4, refer to t23 in FIG. 5), and a memory access (TSB-VA access) by using the TSB virtual address generated by the TSB-VA generation unit 15 is completed (refer to t24 in FIG. 5).

Then, the entering unit 20 enters the cache-hit address translation pair into the TLB 13 (step S25 in FIG. 4, refer to t25, t26 and t27 in FIG. 5; first address entry entering step).

In the information processing apparatus 1, at the same time that the entering unit 20 starts to enter the address translation pair into the TLB 13, the second prefetch controller 23 prefetches data retained at an address on the main memory unit 10 indicated by a physical address of this address translation pair from the main memory unit 10 into the cache memory 12 on the basis of the physical address (step S26 in FIG. 4, refer to t25 to t28 in FIG. 5; second prefetch control step, prefetch control step).

In other words, the second prefetch controller 23 is triggered by a start of entering of the address translation pair into the TLB 13 by the entering unit 20 or triggered by a TLB registration request signal inputted to the entering unit 20 to start prefetching.

In concrete, the second prefetch controller 23 causes the PA generation unit 17 to generate an ultimate physical address on the basis of a virtual address and a physical address of the address translation pair (refer to t25 in FIG. 5; second generation step, generation step).

The second prefetch controller 23 then causes the PA comparator 18 to retrieve from the cache memory 12 by using the ultimate physical address generated by the PA generation unit 17 (refer to t26 in FIG. 5; cache memory retrieval step).

When a cache miss occurs on this occasion (refer to t27 in FIG. 5), the second prefetch controller 23 causes the cache memory controller 19 to prefetch data retained at an address on the main memory unit 10 indicated by a physical address by using this physical address at which a cache miss occurs (that is, to execute a main memory unit access; refer to t28 in FIG. 5).

When receiving this data, the cache memory controller 19 causes the cache memory 12 to retain a pair of this data and the physical address as a cache entry (retaining step). In the example shown in FIG. 5, the data arrives after a normal process (t28 to t32 in FIG. 5) to be described later, hence the retaining step is executed at a timing of t35 in the example in FIG. 5.

On the other hand, when the TTE-Data registration process denoted by step S25 in FIG. 4 and t25 to t28 in FIG. 5 is completed, the instruction computing unit 3 again starts the memory access process by using the virtual address at which the TLB miss occurs (step S27 in FIG. 4). In other words, the procedure returns to the above step S10.

The VA comparator 14 again retrieves from the TLB 13 by using the virtual address at which the TLB miss occurs (step S11 in FIG. 4, refer to t28 in FIG. 5).

Since an address translation pair of this virtual address is already registered as an entry on the TLB 13 in the entering process denoted by the above step S25 in FIG. 4 and t25 to 25 in FIG. 5, an MMU-MISS-TRAP (TLB miss) does not occur but a TLB hit occurs (No route at step S12 in FIG. 4, refer to t29 in FIG. 5).

Then, the PA comparator 18 retrieves data retained at an address on the main memory unit 10 indicated by a physical address from the cache memory 12 by using this physical address corresponding to the virtual address at which the TLB hit occurs (step S28 in FIG. 4, refer to t30 in FIG. 5).

When it is found as a result of retrieval by the PA comparator 18 that a cache entry that is a pair of the physical address and the data is not retained in the cache memory 12 (that is, when a cache miss occurs; No route at step S29 in FIG. 4, refer to t31 in FIG. 5) the cache memory controller 19 executes an access to the main memory unit 10 in order to fetch a pair of the physical address and the data into the cache memory 12 (step S30 in FIG. 4, refer to t32 in FIG. 5).

In the information processing apparatus 1, before a start of a process (VA access; t28 to t32 in FIG. 5) using the virtual address executed after the process of entering an address translation pair of the virtual address at which the TLB miss occurs, and a physical address into TLB 13 (step S25 in FIG. 4, refer to t25 to t28 in FIG. 5), the second prefetch controller 23 executes a prefetch process at the same time that the entering process is started, in order to cause the cache memory 12 to retain a physical address corresponding to the virtual address and data at an address indicated by this physical address as a cache entry (step S26 in FIG. 4, refer to t25 to t28 in FIG. 5).

Therefore, an access to the main memory unit 10 can be executed earlier by a time period equal to four ts (four process unit periods) than the process, in this example (refer to t28 in FIG. 5).

As a result, a timing at which the data is received by the cache memory 12 and entered into the cache memory 12 can be moved up from that of a case where only the normal process is executed, which can shorten the processing time when a TLB miss occurs.

When the cache memory 12 receives data retained at an address indicated by the physical address after a main memory unit access is executed based on a request from the OS (step S30 in FIG. 4, refer to t32 in FIG. 5), a pair of the physical address and the data is entered into the cache memory 12 (refer to t35 in FIG. 5; retaining step), and a memory access using the virtual address at which the TLB miss occurs is again started (refer to step S31 in FIG. 4). Namely, the procedure returns to step S10 in FIG. 4.

The VA comparator 14 executes the third-time retrieval from the TLB 13 by using the virtual address at which the TLB miss occurs (step S11 in FIG. 4, refer to t36 in FIG. 5).

By using a physical address corresponding to the virtual address obtained as a result of the TLB hit (No route at step S12 in FIG. 4, refer to T37 in FIG. 5), the PA comparator 18 again retrieves data indicated by the physical address from the cache memory 12 (step S28 in FIG. 4, refer to t38 in FIG. 5).

Since a pair of the physical address and the data is already registered as a cache entry on the cache memory 12 at the above step S30 (that is, refer to t35 in FIG. 5), this pair of the physical address and the data is hit as a cache entry in this retrieval by the PA comparator 18 (Yes route at step S29 in FIG. 4, refer to t39 in FIG. 5).

The retrieved data is sent to the instruction computing unit 3, and the memory access process is completed (step S32 in FIG. 4, refer to t40 in FIG. 5).

As stated above, according to the information processing apparatus 1 and the prefetch control method according to the first embodiment of this invention, the VA comparator 14 retrieves a TSB address entry from the TLB 13 by using a TSB virtual address at the same time that the TSB-VA generation unit 15 generates the TSB virtual address (second retrieval step), and the first prefetch control unit prefetches an address translation pair of a virtual address at which a TLB miss occurs from the TSB area 11 of the main memory unit 10 into the cache memory 12 by using the retrieved TSB physical address at the same time that the VA comparator 14 retrieves the TSB physical address corresponding to the TSB virtual address (first prefetch control step). Accordingly, before a main memory unit access is executed in order to obtain the address translation pair in the normal process for coping with a TLB miss in the information processing apparatus 1, the first prefetch controller 22 executes a main memory unit access earlier, hence a timing at which the cache memory 12 receives the address translation pair is advanced, as a result, the processing time for a memory access in which the TLB miss occurs can be largely shortened.

At the same time that the entering unit 20 starts to enter the address translation pair into the TLB 13 (entering step; first address entry entering step) the second prefetch control unit 23 prefetches data retained at an address indicated by a physical address of the address translation pair from the main memory unit 10 into the cache memory 12 on the basis of the physical address (second prefetch control step). Accordingly, before a main memory unit access is executed in order to obtain the data in the normal process for coping with a TLB miss in the information processing apparatus 1, the second prefetch controller 23 executes a main memory unit access earlier, hence a timing that the data reaches the cache memory 12 is moved up, as a result, the processing time for a memory access in which a TLB miss occurs can be shortened.

[2] As to Second Embodiment of the Invention

Next, an information processing apparatus according to a second embodiment of this invention will be described. As shown in FIG. 1, an information processing apparatus 1' according to the second embodiment of this invention has the same configuration as the information processing apparatus 1 according to the first embodiment described hereinbefore. Unlike the information processing apparatus 1, the VA comparator 14, the TSB-VA generation unit 15, the PA generation unit 17, the PA comparator 18, the cache memory controller 19, the entering unit 20 and the prefetch controller 21 execute an MMU-MISS-TRAP process on the basis of a signal (hereinafter referred to as a TLB miss signal) indicating that a TLB miss occurs generated before the MMU-MISS-TRAP is reported to the OS when a TLB miss occurs, and a process coping with successive instructions (memory access process) is sequentially executed under pipeline control.

Figure 6:
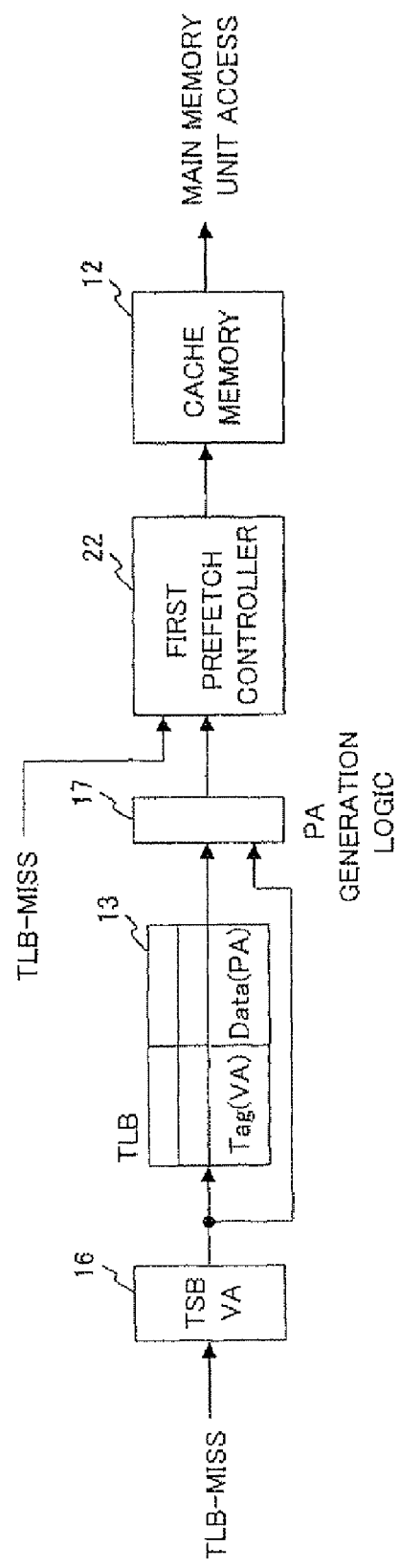
FIG. 6 A block diagram showing an essential configuration of the information processing apparatus as the second embodiment of this invention.

As shown in FIG. 6, in the information processing apparatus 1', the VA comparator 14 retrieves on the basis of a TSB miss signal generated when a TLB miss occurs, and the first prefetch controller 22 executes a prefetch process on the basis of the TLB miss signal at the same time that the VA comparator 14 retrieves a TSB physical address corresponding to a TSB virtual address set in the register 16 from the TLB 13.

Now, a prefetch control method according to the second embodiment of this invention will be described with reference to a flowchart (steps S10, S11, S12' and S13 through S32) shown in FIG. 7. Incidentally, like reference numerals of steps in FIG. 7 designate like or corresponding steps having been described hereinbefore.

Figure 7:
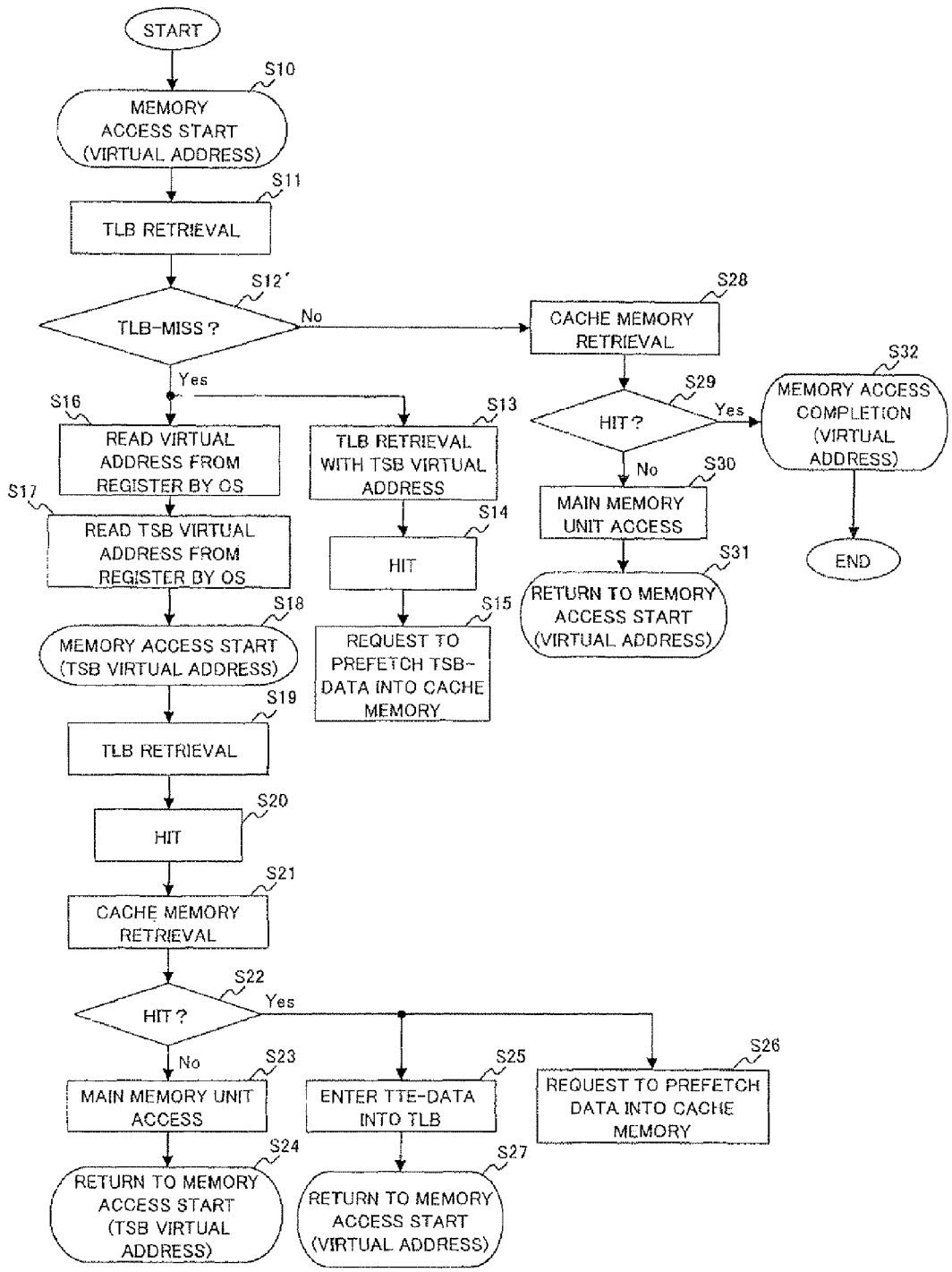
FIG. 7 A flowchart for illustrating a procedure of a prefetch control method as the second embodiment of this invention.

As shown in FIG. 7, this prefetch control method is similar to the prefetch control method according to the above-described first embodiment shown in FIG. 4, excepting that the step (step S12) at which a MMU-MISS-TRAP is reported to the OS in the prefetch control method of the first embodiment is replaced with a step (step S12') at which a TLB miss signal is transmitted.

In other words, in the case where a TLB miss occurs (Yes route at step S12'), when the TSB-VA generator 15 generates a TSB virtual address corresponding one-to-one to a virtual address at which the TLB miss occurs, the VA comparator 14 retrieves from the TLB 13 by using this TSB virtual address (step S13) and the first prefetch controller 22 prefetches an address translation pair of the virtual address into the cache memory 12 by using a TSB physical address that has been hit (step S14).

On the other hand, after a report of MMU-MISS-TRAP to the OS from the instruction computing unit 3 due to occurrence of the TLB miss (Yes route at step S12'), a process denoted by steps S16 to S27 is carried out like the prefetch control method of the above-described first embodiment.

Consequently, the information processing apparatus 1' and the prefetch control method can provide similar working effects to those provided by the above-described first embodiment.

Figure 8:
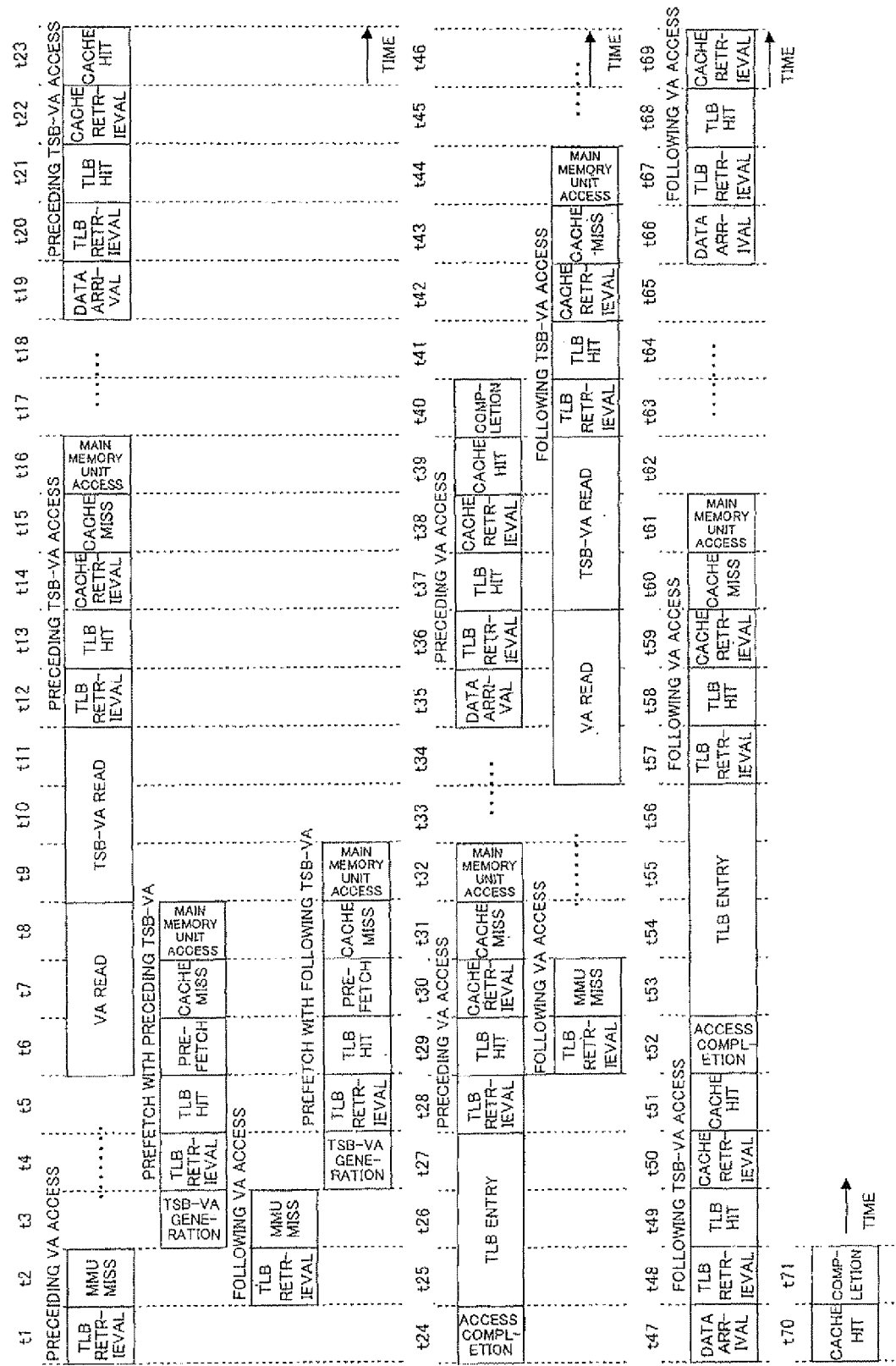
FIG. 8 A time chart showing an example of the procedure of the prefetch control method as the second embodiment of this invention.
Figure 9:
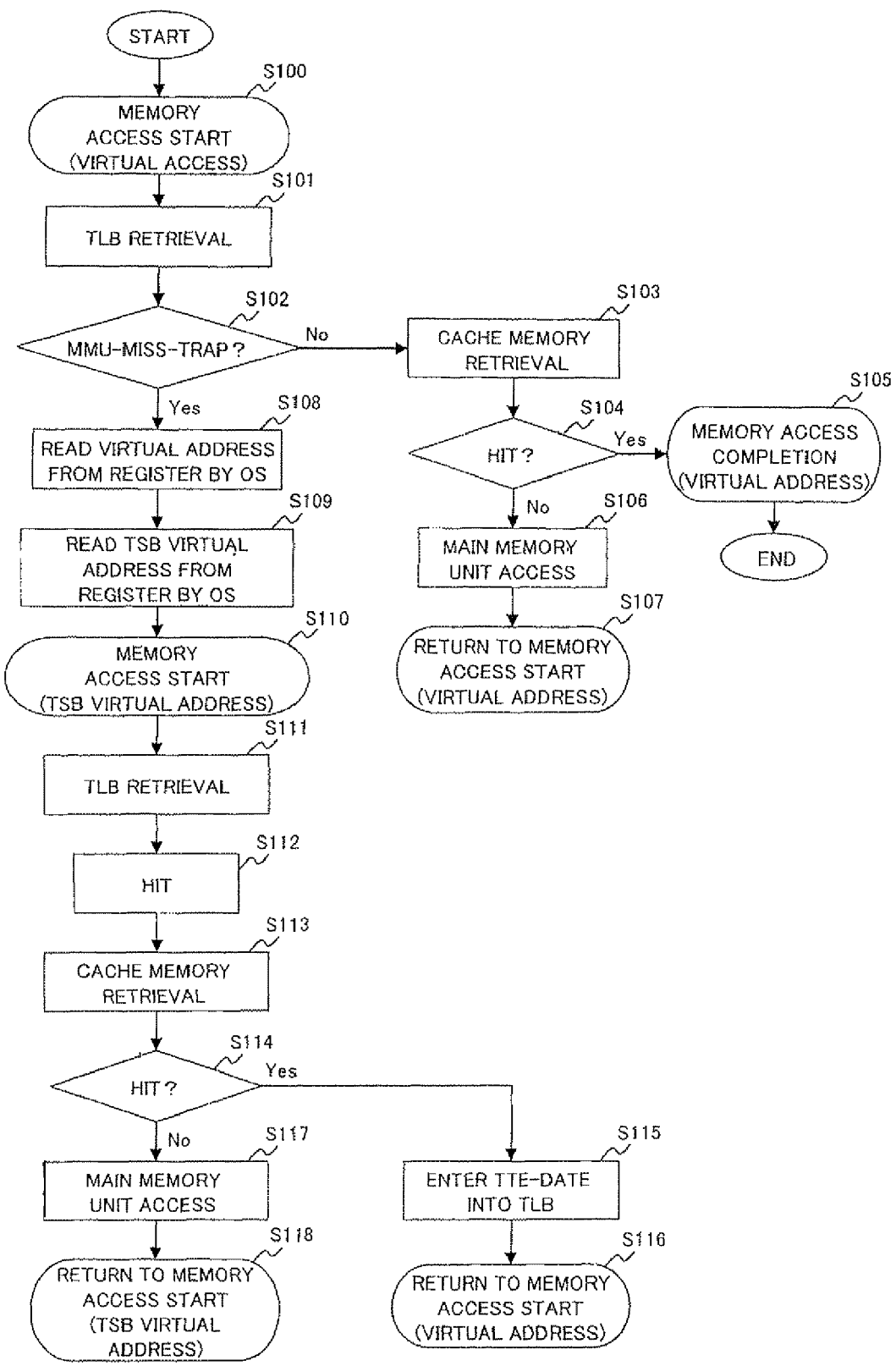
FIG. 9 A flowchart for illustrating a procedure of operation of an information processing apparatus equipped with a known MMU (Memory Management Unit)
Figure 10:
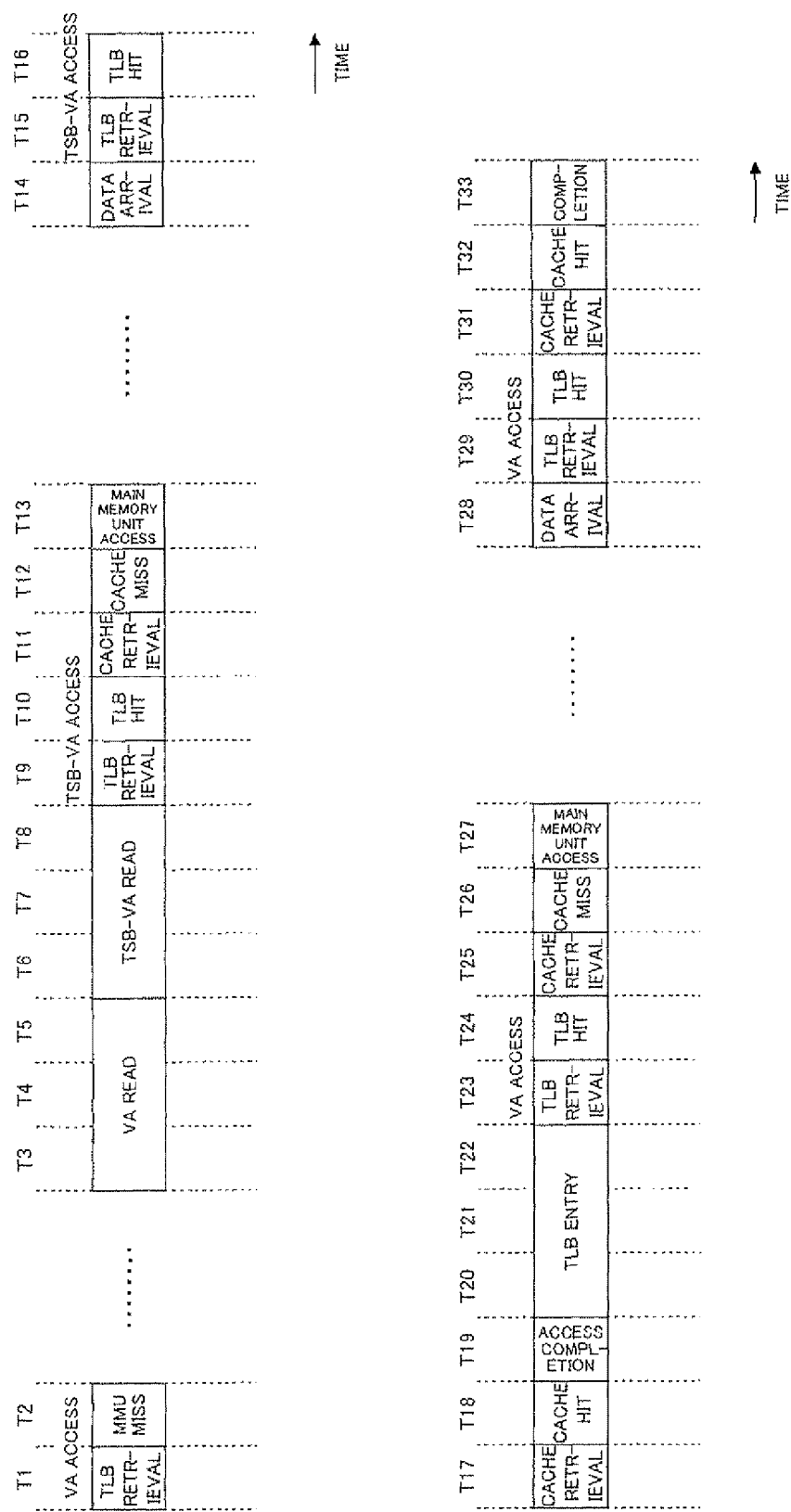
FIG. 10 A time chart showing an example of the procedure of operation of the information processing apparatus equipped with the known MMU.

In the information processing apparatus 1', as stated above, the VA comparator 14, the TSB-VA generator 15, the PA generator 17, the PA comparator 18, the cache memory controller 19, the entering unit 20 and the prefetch controller 21 are under the pipeline control. Now, the pipeline operation of the information processing apparatus 1' (that is, a memory access process for coping with two successive instructions performed by the information processing apparatus 1') will be described with reference to a time chart (t1 through t71) shown in FIG. 8. Incidentally, detailed descriptions of contents of processes in FIG. 8 similar to those of the processes having already described hereinbefore are omitted, here. In FIG. 8, t1 to t71 indicate processing unit time periods of the information processing apparatus 1'.

As shown in FIG. 8, in the information processing apparatus 1', when two instructions are successively inputted to the instruction computing unit 3, the VA comparator 14 retrieves from the TLB 13 by using a preceding virtual address to be processed (refer to t1). When a TLB miss occurs on this occasion (refer to t2), processes by the TSB-VA generator 15, the VA comparator 14 and the first prefetch controller 22 (the PA comparator 18 and the cache memory controller 19) are successively executed (refer to t3 to t8). Incidentally, the processes at t3 to t8 are similar to those designated by t3 to t8 in FIG. 4.

In the information processing apparatus 1', as soon as the retrieval (refer to t1) using the preceding virtual address is completed, the VA comparator 14 retrieves from the TLB 13 by using a following virtual address (refer to t2).

Thereafter, when a TLB miss occurs on the following virtual address as well, the TSB-VA generator 15, the VA comparator 14 and the first prefetch controller 22 execute a process for the following address as soon as the process for the preceding virtual address is completed (that is, in the following processing unit time period) (refer to t4 to t9).

In the example shown in FIG. 8, the processes for the following virtual address by the TSB-VA generator 15, the VA comparator 14 and the first prefetch controller 22 are executed behind by one t (one processing unit time period) from the processes for the preceding virtual address, hence the processes for the preceding virtual address and the processes for the following virtual address are sequentially executed.

Generally, for the following virtual address, the process is executed at a timing of t29, and fetching of an address translation pair of a virtual address, at which a TLB miss occurs, corresponding to a TSB physical address from the TSB area 11 (main memory unit access) based on a request from the OS is executed at a timing of t44. To the contrary, in the information processing apparatus 1, since it is possible to execute the main memory unit access earlier at a timing of t9 as above, a timing at which data is entered into the cache memory 12 can be earlier than a case where only the normal process is executed. As a result, it is possible to shorten the processing time when the TLB miss occurs in both successive memory accesses.

FIG. 8 depicts a case where a cache miss occurs (refer to t43) as a result of retrieval (refer to t42) using a TSB physical address by the PA comparator 18 in the normal process (refer to t29 to t71) for the following virtual address. However, since a main memory unit access is executed at a timing of t9 as described above, there is possibility that a cache hit occurs. In such case, it is possible to further shorten the processing time of the memory access process.

In the above example, two instructions succeed. When three or more instructions succeed, the prefetch process by the prefetch controller 21 in the process responsive to the instruction is executed earlier than the normal process. For this, the lower the order of instruction, the larger is the effect of processing time shortening by the prefetch process.

In FIG. 8, the process denoted by t1 to t40 for the preceding virtual address ("preceding VA access" and "preceding TSB-VA access" in the drawing) is similar to that denoted by t1 to t40 in FIG. 4 described hereinbefore. Further, contents of the process denoted by t29 to t71 for the following virtual address ("following VA access" and "following TSB-VA access" in the drawing) are similar to those of the process denoted by t1 to t40 for the preceding virtual address, excepting virtual addresses to be processed.

According to the information processing apparatus 1' of the second embodiment of this invention, the VA comparator 14, the TSB-VA generator 15, the PA generator 17, the PA comparator 18, the cache memory controller 19, the entering unit 20 and the prefetch controller 21 operate on the basis of a TLB miss signal generated before a report of MMU-MISS-TRAP to the OS, and are under the pipeline control. For this reason, even when TLB misses occur on successive instructions, a memory access in response to the preceding instruction and a memory access in response to the following instruction can be sequentially executed, not waiting completion of the memory access responsive to the preceding instruction. Whereby, the prefetch process for the following instruction by the prefetch controller 21 can be largely moved up, and the cache memory 12 can retain data (address translation pair or data corresponding to a physical address) in a very early stage. Therefore, even when TLB misses occur in successive memory accesses, the processing time for the processes can be shortened.

[3] Others

Note that the present invention is not limited to the above examples, but may be modified in various ways without departing from the spirit and scope of the invention.

In the present invention, the processing unit time period in the time charts in FIGS. 5 and 8 described hereinbefore are not restrictive. In other words, the processing time period or which each process is executed (a length of the processing time period of each process) shown in the time charts in FIGS. 5 and 8 are not restrictive in this invention.

As described above in detail, an information processing apparatus according to the present invention comprises: an instruction computing unit executing an instruction; a main memory unit retaining data relating to the instruction executed by the instruction computing unit, and having an address translation table retaining a first address translation pair of a first physical address indicating an address at which the data is retained and a first virtual address corresponding to the first physical address; a cache memory interposed between the instruction computing unit and the main memory unit to temporarily retain data; an address translation buffer retaining a second address translation pair of a second physical address indicating an address at which the first address translation pair is retained in the address translation table and a second virtual address corresponding to the second physical address, and being able to retain the first address translation pair; a first retrieval unit retrieving the first address translation pair of the first virtual address to be processed from the address translation buffer; a first generator generating a second virtual address corresponding to the first virtual address on the basis of the first virtual address when it is found as a result of retrieval by the first retrieval unit that the first address translation pair of the first virtual address to be processed is not retained in the address translation buffer; a second retrieval unit retrieving a second address translation pair of the generated second virtual address from the address translation buffer at the same time that the second virtual address is generated by the first generator; and a first prefetch controller prefetching the first address translation pair of the first virtual address to be processed by using the retrieved second physical address from the address translation table into the cache memory at the same time that the second physical address corresponding to the second virtual address is retrieved by the second retrieval unit.

It is preferable that the first retrieval unit, the first generator, the second retrieval unit and the first prefetch controller be under the pipeline control, and that the first retrieval unit, the first generator, the second retrieval unit and the first prefetch controller execute, in parallel, processes in response to successive instructions.

It is preferable that the information processing apparatus further comprises a cache memory retrieval unit retrieving a pair of the second physical address and the first address translation pair from the cache memory, and that the first prefetch controller cause the cache memory retrieval unit to retrieve a pair of the second physical address and a first address translation pair retained at an address indicated by the second physical address from the cache memory on the basis of the second physical address, and when it is found as a result of retrieval by the cache memory retrieval unit that the pair of the second physical address and the first address translation pair is not retained in the cache memory, read the first address translation pair from the address translation table, and cause the cache memory to retain the pair of the second physical address and the first address translation pair.

It is preferable that the information processing apparatus further comprises an entering unit entering a first address translation pair of the first virtual address to be processed retained in the cache memory into the address translation buffer; and a second prefetch controller prefetching data retained at an address indicated by a first physical address from the main memory unit into the cache memory on the basis of the first physical address of the first address translation pair at the same time that the entering unit starts to enter the first address translation pair into the address translation buffer.

It is preferable that the information processing apparatus still further comprises a second generator generating an ultimate physical address relating to the second virtual address on the basis of the second virtual address and the second physical address, and that the first prefetch controller execute the prefetching by using an ultimate physical address generated by the second generator.

An information processing apparatus according to the present invention comprises: an instruction computing unit executing an instruction; a main memory unit retaining data relating to an instruction executed by the instruction computing unit and having an address translation table retaining a first address translation pair of a first physical address indicating an address at which the data is retained and a first virtual address corresponding to the first physical address; a cache memory interposed between the instruction computing unit and the main memory unit to temporarily retain the data; an address translation buffer retaining a second address translation pair of a second physical address indicating an address at which the first address translation pair is retained in the address translation table and a second virtual address corresponding to the second physical address, and being able to retain the first address translation pair; a retrieval unit retrieving the first address translation pair of the first virtual address to be processed from the address translation buffer; a first address translation pair entering unit entering the first address translation pair of the first virtual address into the address translation buffer on the basis of the second address translation pair corresponding to the first virtual address when it is found as a result of retrieval by the retrieval unit that the first address translation pair of the first virtual address to be processed is not retained in the address translation buffer; and a data prefetch controller prefetching data retained at an address indicated by the first physical address from the main memory unit into the cache memory on the basis of the first physical address of the first address translation pair at the same time that the first address translation pair entering unit starts to enter the first address translation pair into the address translation buffer.

It is preferable that the information processing apparatus further comprises a cache memory retrieval unit retrieving a pair of the first physical address and the data from the cache memory; and that the data prefetch controller causes the cache memory retrieval unit to retrieve a pair of the first physical address and the data retained at an address indicated by the first physical address from the cache memory on the basis of the first physical address, read the data when it is found as a result of retrieval by the cache memory retrieval unit that the pair of the first physical address and the data is not retained in the cache memory, and cause the cache memory to retain the pair of the first physical address and the data.

It is preferable that the information processing apparatus still further comprises a generator generating an ultimate physical address for the first virtual address on the basis of the first virtual address and the first physical address; and that the data prefetch controller execute the prefetching by using the ultimate physical address generated by the generator.

A prefetch control method for prefetching a first address translation pair into an address translation buffer in an information processing apparatus comprising an instruction computing unit executing an instruction, a main memory unit retaining data relating to the instruction executed by the instruction computing unit and having an address translation table retaining the first address translation pair of a first physical address indicating an address at which the data is retained and a first virtual address corresponding to the first physical address, a cache memory interposed between the instruction computing unit and the main memory unit to temporarily retain the data, and an address translation buffer retaining a second address translation pair of a second physical address indicating an address at which the first address translation pair is retained in the address translation table and a second virtual address corresponding to the second physical address and being able to retain the first address translation pair, the prefetch control method comprises: a first retrieval step of retrieving the first address translation pair of the first virtual address to be processed from the address translation buffer; a first generation step of generating a second virtual address corresponding to the first virtual address on the basis of the first virtual address when it is found as a result of retrieval at the first retrieval step that the first address translation pair of the first virtual address to be processed is not retained in the address translation buffer; a second retrieval step of retrieving the second address translation pair of the generated second virtual address from the address translation buffer at the same time that the second virtual address is generated at the first generation step; and a first prefetch control step of prefetching the first address translation pair of the first virtual address to be processed by using the retrieved second physical address from the address translation table of the main memory unit into the cache memory at the same time that the second physical address corresponding to the second virtual address is retrieved at the second retrieval step.

It is preferable that the first retrieval step, the first generation step, the second retrieval step and the first prefetch control step are executed in parallel under a pipeline control in response to successive instructions.

It is preferable that the first prefetch control step comprises: a cache memory retrieval step of retrieving a pair of the second physical address and the first address translation pair retained at an address indicated by the second physical address from the cache memory on the basis of the second physical address; and a retaining step of reading the first address translation pair from the address translation table when it is found as a result of retrieval at the cache memory retrieval step that the pair of the second physical address and the first address translation pair is not retained in the cache memory, and causing the cache memory to retain the pair of the second physical address and the first address translation pair.

It is preferable that the prefetch control method further comprises: an entering step of entering the first address translation pair of the first virtual address to be processed retained in the cache memory into the address translation buffer; and a second prefetch control step of prefetching data retained at an address indicated by the first physical address from the main memory unit into the cache memory on the basis of the first physical address of the first address translation pair at the same time that entering of the first address translation pair into the address translation buffer is started at the entering step.

It is preferable that the prefetch control method still further comprises a second generation step of generating an ultimate physical address for the second virtual address on the basis of the second virtual address and the second physical address, and that, at the first prefetch control step, the prefetching is executed by using the ultimate physical address generated at the second generation step.

A prefetch control method for prefetching data relating to an instruction into a cache memory in an information processing apparatus comprising an instruction computing unit executing the instruction, a main memory unit retaining the data relating to the instruction executed by the instruction computing unit and having an address translation table retaining a first address translation pair of a first physical address indicating an address at which the data is retained and a first virtual address corresponding to the first physical address, a cache memory interposed between the instruction computing unit and the main memory unit to temporarily retain the data, and an address translation buffer retaining a second address translation pair of a second physical address indicating an address at which the first address translation pair is retained in the address translation table and a second virtual address corresponding to the second physical address, and being able to retain the first address translation pair, the prefetch control method comprises: a retrieval step of retrieving the first address translation pair of the first virtual address to be processed from the address translation buffer; a first address translation pair entering step of entering the first address translation pair of the first virtual address into the address translation buffer on the basis of the second address translation pair corresponding to the first virtual address when it is found as a result of retrieval at the retrieval step that the first address translation pair of the first virtual address to be processed is not retained in the address translation buffer; and a data prefetch control step of prefetching data retained at an address indicated by the first physical address from the main memory unit into the cache memory on the basis of the first physical address of the first address translation pair at the same time that entering of the first address translation pair into the address translation buffer is started at the first address translation pair entering step.

It is preferable that the data prefetch control step comprises a cache memory retrieval step of retrieving a pair of the first physical address and the data retained at an address indicated by the first physical address from the cache memory on the basis of the first physical address; and a retaining step of reading the data and causing the cache memory to retain the pair of the first physical address and the data when it is found as a result of retrieval at the cache memory retrieval step that the pair of the first physical address and the data is not retained in the cache memory.

It is preferable that the prefetch control method further comprises a generation step of generating an ultimate physical address for the first virtual address on the basis of the first virtual address and the first physical address, and that the prefetching is executed, at the data prefetch control step, by using the ultimate physical address generated at the generation step.

What is claimed is:

1. An arithmetic processor connected to a memory unit as an address translation table retaining a first address translation pair which is a pair of a first physical address at which data is retained and a first virtual address corresponding to the first physical address, the arithmetic processor comprising:
    a cache memory;
    an address translation buffer retaining a second address translation pair which is a pair of a second physical address indicating an address at which the first address translation pair is retained in said memory unit and a second virtual address corresponding to the second physical address, and being able to retain the first address translation pair;
    a first retrieval unit retrieving the first physical address from said address translation buffer by using the first virtual address;
    a second retrieval unit retrieving the second physical address from said address translation buffer by using the second virtual address corresponding one-to-one to the first virtual address; and
    a prefetch controller entering the first address translation pair of the first virtual address from said address translation table into said cache memory by using the second physical address retrieved by said second retrieval unit.

2. The arithmetic processor according to claim 1 further comprising:
    a virtual address generator;
    wherein, when the first address translation pair corresponding to the first virtual address is not retained in said address translation buffer, said virtual address generator generates the second virtual address corresponding one-to-one to the first virtual address.

3. The arithmetic processor according to claim 2, wherein said first retrieval unit, said virtual address generator, said second retrieval unit and said prefetch controller are under a pipeline control; and
    said first retrieval unit, said virtual address generator, said second retrieval unit and said prefetch controller sequentially execute processes in response to successive instructions.

4. The arithmetic processor according to claim 1, wherein said prefetch controller comprises:
    a first prefetch controller retrieving the first address translation pair from said address translation table by using the second physical address, and entering a set of the second physical address and the retrieved first address translation pair into said cache memory; and
    a second prefetch controller, when said address translation buffer starts to enter the first address translation pair, entering data retained at the first physical address from said memory unit into said cache memory on the basis of the first physical address contained in the first address translation pair.

5. An information processing apparatus comprising:
    a memory unit as an address translation table retaining a first address translation pair which is a pair of a first physical address at which data is retained and a first virtual address corresponding to the first physical address;
    a cache memory;
    an address translation buffer retaining a second address translation pair which is a pair of a second physical address indicating an address at which the first address translation pair is retained in said memory unit and a second virtual address corresponding to the second physical address, and being able to retain the first address translation pair;
    a first retrieval unit retrieving the first physical address from said address translation buffer by using the first virtual address;
    a second retrieval unit retrieving the second physical address from said address translation buffer by using the second virtual address corresponding one-to-one to the first virtual address; and
    a prefetch controller entering the first address translation pair of the first virtual address from said address translation table into said cache memory by using the second physical address retrieved by said second retrieval unit.

6. The information processing apparatus according to claim 5 further comprising:
    a virtual address generator;
    wherein, when the first address translation pair corresponding to the first virtual address is not retained in said address translation buffer, said virtual address generator generates the second virtual address corresponding one-to-one to the first virtual address.

7. The information processing apparatus according to claim 6, wherein said first retrieval unit, said virtual address generator, and said second retrieval unit and said prefetch controller are under a pipeline control; and
    said first retrieval unit, said virtual address generator, said second retrieval unit and said prefetch controller sequentially execute processes in response to successive instructions.

8. The information processing apparatus according to claim 5, wherein said prefetch controller comprises:
    a first prefetch controller retrieving the first address translation pair from said address translation table by using the second physical address, and entering a set of the second physical address and the retrieved first address translation pair into said cache memory; and a second prefetch controller, when said address translation buffer starts to enter the first address translation pair, entering data retained at the first physical address from said memory unit into said cache memory on the basis of the first physical address contained in the first address translation pair.

9. A memory access method in an arithmetic processor comprising the steps of:

retaining a first address translation pair which is a pair of a first physical address at which data is retained and a first virtual address corresponding to the first physical address in a memory unit as an address translation table;

retaining a second address translation pair which is a pair of a second physical address indicating an address at which the first address translation pair is retained and a second virtual address corresponding to the second physical address, and retaining the first address translation pair;

retrieving the first physical address from the address translation buffer means by using the first virtual address;

retrieving the second physical address from the address translation buffer means by using the second virtual address corresponding one-to-one to the first virtual address; and entering the first address translation pair of the first virtual address from the address translation table into a cache memory by using the second physical address which is a result of the retrieval.

10. The memory access method in an arithmetic processor according to claim 9, wherein, the step of retaining the first address translation pair comprises a step of:

entering data retained at the first physical address from said memory unit into said cache memory on the basis of the first physical address contained in the first address translation pair.

* * * * *